United States Patent
Ang et al.

(10) Patent No.: US 9,568,885 B2
(45) Date of Patent: Feb. 14, 2017

(54) COMPOSITE HOLOGRAPHIC OPTICAL DIFFUSER STRUCTURE WITH HIGH FREQUENCY OVERLAY AND METHOD OF FABRICATION THEREOF

(71) Applicant: LUMINIT LLC, Torrance, CA (US)

(72) Inventors: Anthony Ang, Long Beach, CA (US); Stanley Tafeng Kao, Torrance, CA (US); Christopher Leister, Huntington Beach, CA (US)

(73) Assignee: LUMINIT LLC, Torrance, CA (US)

( * ) Notice: Subject to any disclaimer, the term of this patent is extended or adjusted under 35 U.S.C. 154(b) by 0 days.

(21) Appl. No.: 14/469,277

(22) Filed: Aug. 26, 2014

(65) Prior Publication Data

US 2015/0056561 A1  Feb. 26, 2015

Related U.S. Application Data

(60) Provisional application No. 61/870,020, filed on Aug. 26, 2013.

(51) Int. Cl.
*G03H 1/06* (2006.01)
*G03H 1/32* (2006.01)
(Continued)

(52) U.S. Cl.
CPC ......... *G03H 1/0402* (2013.01); *G02B 5/0252* (2013.01); *G02B 5/0268* (2013.01); *G02B 5/32* (2013.01); *G02B 27/48* (2013.01); *G03H 1/0244* (2013.01); *G03H 1/202* (2013.01); *G03H 2001/0439* (2013.01)

(58) Field of Classification Search
None
See application file for complete search history.

(56) References Cited

U.S. PATENT DOCUMENTS 4,427,265 A * 1/1984 Suzuki et al. ............... 359/599
4,521,087 A * 6/1985 Hayes et al. ................ 359/503
(Continued)

FOREIGN PATENT DOCUMENTS

JP  01-143904  * 6/1989
JP  06-175570  * 6/1994
(Continued)

OTHER PUBLICATIONS

Li et al. "Design and fabrication of high efficiency diffuser film based on laser speckle", Proc. SPIE vol. 8416, Article 841611 (6 pages) (2012).*
(Continued)

*Primary Examiner* — Martin Angebranndt
(74) *Attorney, Agent, or Firm* — Husch Blackwell LLP

(57) ABSTRACT

The optical diffuser mastering of the subject invention includes legacy microstructure surface relief patterns, along with smaller ones, overlaid on the larger ones. The characteristic features produced by the present invention will be found useful to eliminate visible structures in/on optical diffusers, such as those used in movie projection screens (utilizing either coherent (i.e., laser-generated) and non-coherent (e.g., lamp-generated) light), head-up displays (HUDs), laser projection viewing, etc., as the present invention produces much sharper images than those afforded by traditional holographic optical diffusers.

4 Claims, 10 Drawing Sheets

(51) Int. Cl.
*G03H 1/04* (2006.01)
*G02B 5/32* (2006.01)
*G02B 27/48* (2006.01)
*G02B 5/02* (2006.01)
*G03H 1/02* (2006.01)
*G03H 1/20* (2006.01)

(56) References Cited

U.S. PATENT DOCUMENTS

| | | | | |
|---|---|---|---|---|
| 4,830,441 | A | * | 5/1989 | Chang ........................ 359/15 |
| 5,449,597 | A | * | 9/1995 | Sawyer ...................... 430/523 |
| 5,534,386 | A | * | 7/1996 | Petersen ............ G02B 5/0252 264/1.31 |
| 5,721,630 | A | * | 2/1998 | Horner et al. ................. 359/15 |
| 5,796,499 | A | * | 8/1998 | Wenyon ........................ 359/15 |
| 2004/0100699 | A1 | * | 5/2004 | Cowan et al. ................ 359/599 |
| 2007/0268585 | A1 | * | 11/2007 | Santoro et al. .............. 359/599 |
| 2011/0085241 | A1 | * | 4/2011 | Purchase et al. ............ 359/599 |

FOREIGN PATENT DOCUMENTS

| | | | |
|---|---|---|---|
| JP | 09-265252 | * | 10/1997 |
| JP | 09-320119 | * | 12/1997 |

OTHER PUBLICATIONS

Xu et al., "Characterization and modeling of static speckle in laser projection display", Opt. Precis. Eng., vol. 21(12) (8 pages) (Dec. 2013).*

Wadle et al., "Holographic diffusers", Opt. Eng., vol. 33(1) pp. 213-218 (Jan. 1994).*

Kumar et al."Speckle photography of out of plane motion: Effect of multiple-exposures in free space geometry of recording", J. Opt. (Paris), vol. 21(1) pp. 19-25 (1990).*

Francon, "Information processing using speckle patterns" in Laser Speckle and related phenomona, Topics in Applied Physics vol. 9 pp. 171-201 (1975).*

Gray, "A methods of forming optical diffusers of simple known statistical properties" Opt. Acta vol. 25(8) pp. 765-775 (1978).*

* cited by examiner (Each Tick Mark Span Represents 2.38 Microns)

(Each Tick Mark Span Represents 2.38 Microns)

1000

(Each Tick Mark Span Represents 2.38 Microns)

COMPOSITE HOLOGRAPHIC OPTICAL DIFFUSER STRUCTURE WITH HIGH FREQUENCY OVERLAY AND METHOD OF FABRICATION THEREOF

FIELD OF THE INVENTION

The present invention is in the field of optics. In particular, it is in the area of optical diffusers.

BACKGROUND OF THE INVENTION

The prior art in holographic optical diffusers, which can be found in U.S. Pat. Nos. 6,675,863, 7,700,199, and 8,097,311, all of which are incorporated in their entirety by reference, comprises three-dimensional (3-D) surface relief patterns produced by optically recording laser speckle in thick (10 microns to 60 microns) photoresist material.

Referring to FIG. 1, an optical bench setup 100 capable of recording prior art holographic optical diffuser(s) in planar format, may be used as the starting point for improvements that comprise the present invention.

Referring to FIG. 2, an optical bench setup 200 capable of recording prior art holographic optical diffuser(s) in cylindrical (seamed and seamless) format, may be used as the starting point for improvements that comprise the present invention.

SUMMARY OF THE INVENTION

This invention describes a method to produce high frequency structures on top of classical holographic optical diffusers using modified holographic optical recording setups.

This innovation in optical diffuser mastering includes legacy microstructure surface relief patterns, along with smaller ones, overlaid on the larger ones. The characteristic features produced by the present invention will be found useful when viewers do not want to see visible structures in/on optical diffusers, such as those used in movie projection screens (utilizing either coherent (i.e., laser-generated) and non-coherent (e.g., lamp-generated) light), head-up displays (HUDs), liquid crystal displays (LCDs), non-motion picture laser projection viewing, etc., as the present invention produces much sharper images than those afforded by traditional holographic optical diffusers. Additionally, it can reduce glare, reduce Moiré artifacts, and add a specific, controllable amount of haze. As a result, it positively impacts the experience of end users.

Therefore, the present invention reduces the visibility of optical artifacts visible with the unaided human eye at working distances relevant to particular application of said optical diffuser. Alternately, a high-fidelity replica of said optical diffuser master may be used in any particular target application with substantially the same benefits as the optical diffuser master of the present invention.

DETAILED DESCRIPTION OF THE PREFERRED EMBODIMENTS

The present invention, a composite holographic optical diffuser and method of fabrication thereof, comprises a composite surface relief structure, which acts as a suppressor to visible optical artifacts—in particular, undesirable ones.

The present invention does this by overlaying smaller (higher spatial frequency) microstructures on top of lower-frequency ones by either of the following:

Method 1

Performing a first exposure with larger microstructure projections (about 5-100 microns) upon a target substrate coated with photoresist recording media followed by a second exposure with smaller microstructures (about 0.5-3 microns) projected upon the same substrate (i.e., on top of the larger microstructures). The photoresist can be either developed or left undeveloped between these two exposures.

Method 2

Placing a partial mirror between the mid-diffuser and the target substrate coated with photoresist recording media, with the partial mirror close (less than 4 inches and preferably 0.25 inches to 3 inches) to the target substrate, so as to produce a substantial (i.e., recordable) re-reflection of the part of the original recording light that is reflected from the recording media.

Figure 3:
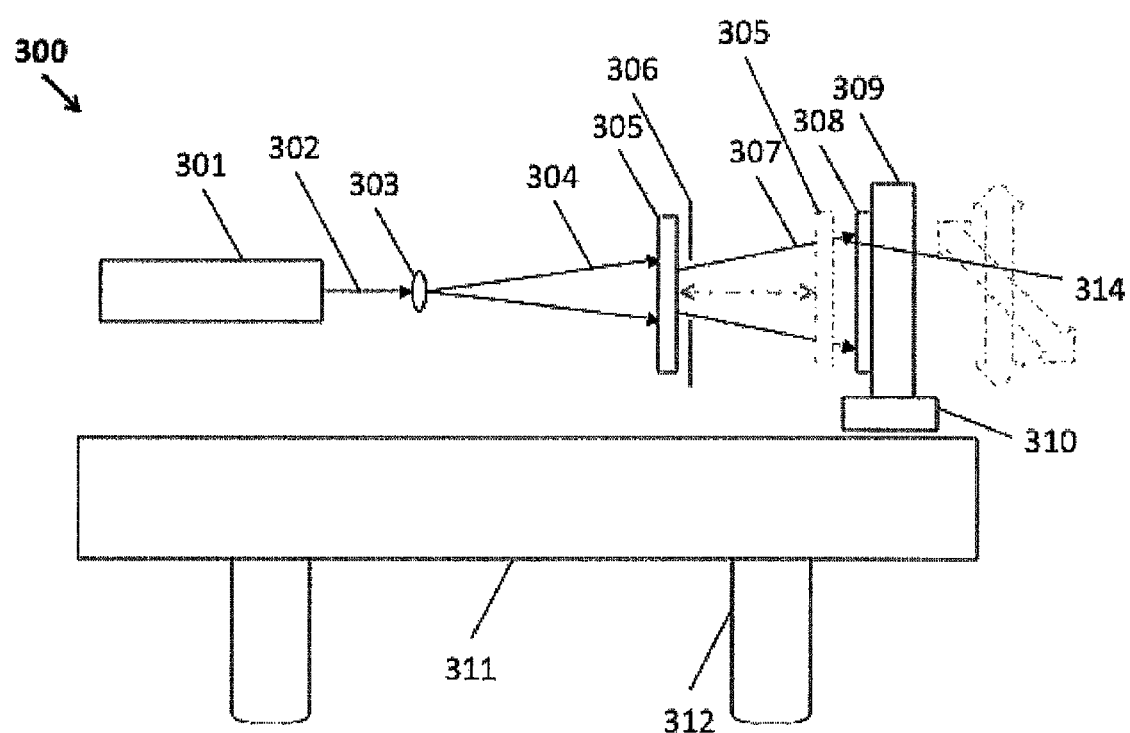
FIG. 3 is an illustration of one preferred embodiment the present invention, as it would be used in practice, to produce composite holographic optical diffusers in a planar format.

Referring to FIG. 3, the present invention is retrofittable to existing equipment 300 used to fabricate planar holographic optical diffuser masters by introducing a fixture (Method 1) to move the mid-diffuser 305 much closer less than 4 inches (and preferably 0.25 inches to 3 inches, to the target recording media (and substrate) than is done in prior art setups and performing a second exposure. The setup comprises a laser 301, its raw laser beam 302, lensing 303, refracted laser beam 304, a mid-diffuser 305, an aperture 306, a patterned laser beam (307 for the first exposure and 314 for the second exposure), a target substrate 308 mounted to a support structure 309 and an x-y translation stage 310 mounted upon an optical bench 311 supported by vibration-isolation elements 312.

Figure 4:
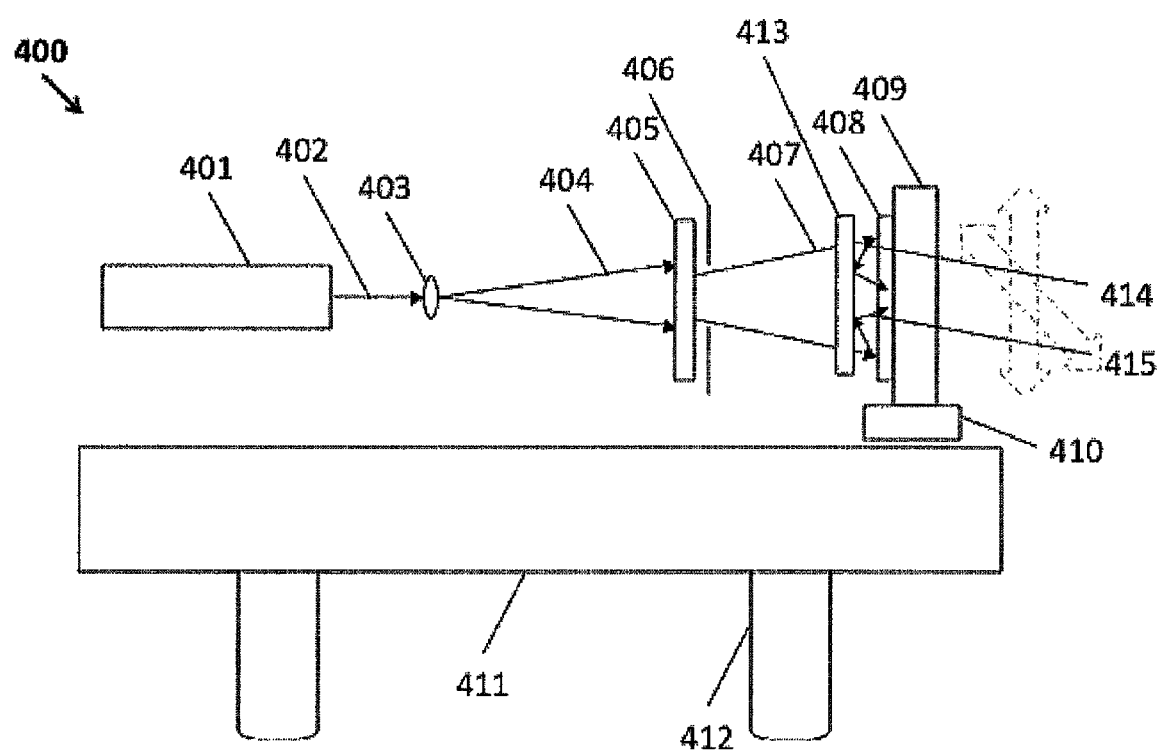
FIG. 4 is an illustration of another preferred embodiment the present invention, as it would be used in practice, to produce composite holographic optical diffusers in a planar format.

Referring to FIG. 4, the present invention is retrofittable to existing equipment 400 used to fabricate cylindrical optical holographic optical diffuser masters by introducing a partial mirror 413 between the mid-diffuser and the target substrate coated with photoresist recording media (Method 2), with the partial mirror 413 close (about preferably 3 inches) to the target substrate, so as to produce a substantial (i.e., recordable) re-reflection 415 of the part of the original recording light that is reflected from the recording media. The setup comprises a laser 401 its raw laser beam 402, lensing 403, refracted laser beam 404, a mid-diffuser 405, an aperture 406, a patterned laser beam 407 and 414, a target substrate 408 and an x-y translation stage 410 mounted upon an optical bench 411 supported by vibration-isolation elements 412.

Figure 5:
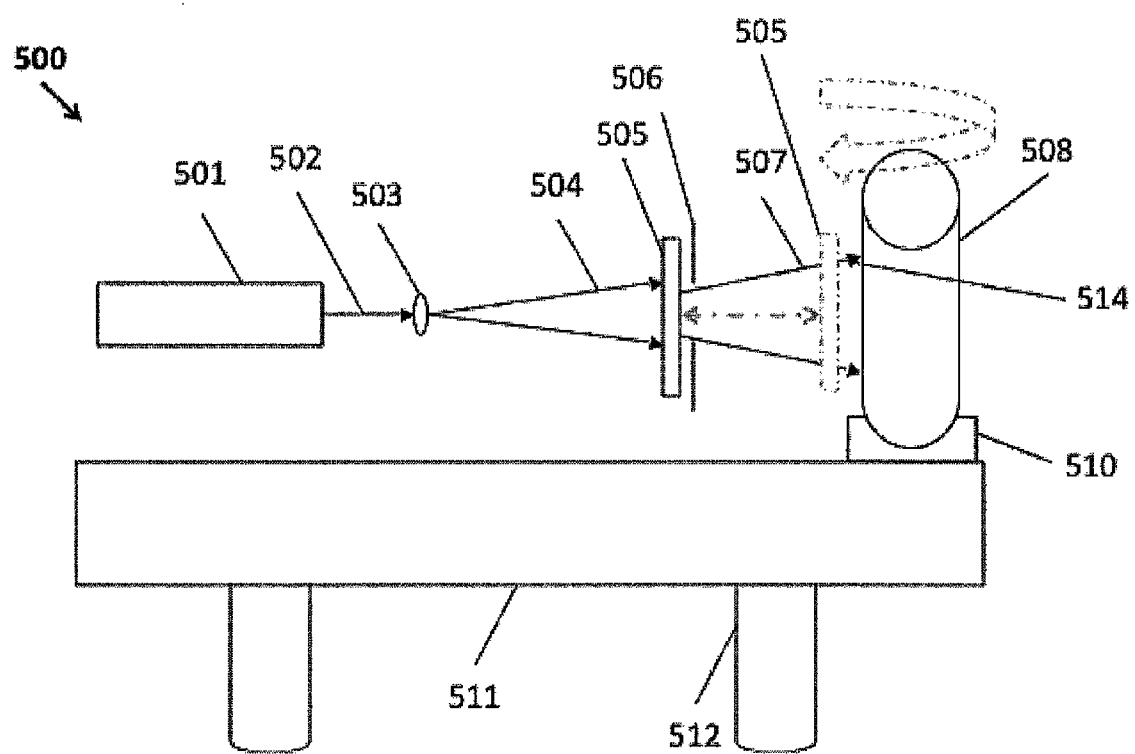
FIG. 5 is an illustration of one preferred embodiment the present invention, as it would be used in practice, to produce composite holographic optical diffusers in a cylindrical (seamed and seamless) format.

Referring to FIG. 5, the present invention is retrofittable to existing equipment 500 used to fabricate seamed and seamless holographic optical diffuser masters by introducing a fixture (Method A) to move the mid-diffuser 505 much closer about 0.25 inches to 4 inches and preferably 3 inches, to the target recording media (and substrate) than is done in prior art setups and performing a second exposure. The setup comprises a laser 501 its raw laser beam 502, lensing 503, refracted laser beam 504, a mid-diffuser 505, an aperture 506, a patterned laser beam 507, a target substrate 508 and an x translation stage with rotation stage 510 mounted upon an optical bench 511 supported by vibration-isolation elements 512.

Figure 6:
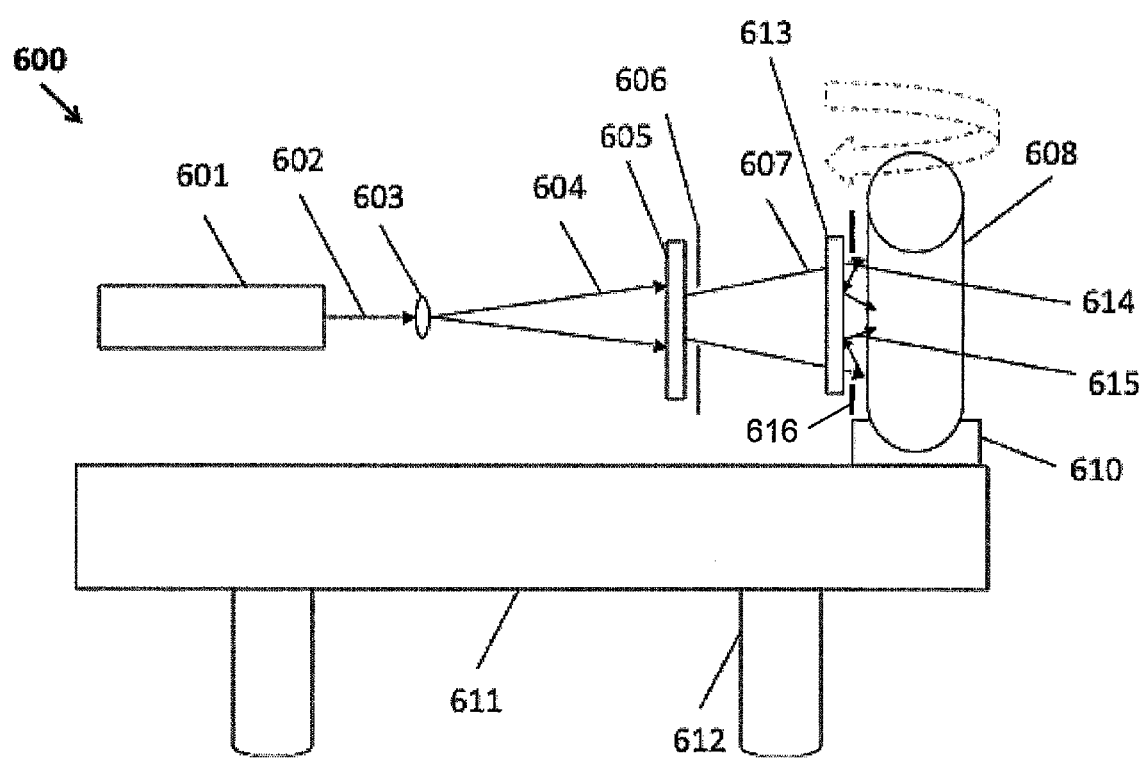
FIG. 6 is an illustration of another preferred embodiment the present invention, as it would be used in practice, to produce composite holographic optical diffusers in a cylindrical (seamed and seamless) format.

Referring to FIG. 6, the present invention is retrofittable to existing equipment 600 used to fabricate cylindrical optical holographic optical diffuser masters by introducing a partial mirror 613 between the mid-diffuser and the target substrate coated with photoresist recording media (Method 2), with the partial mirror 613 close (less than 4 inches and preferably 3 inches) to the target substrate, so as to produce a substantial (i.e., recordable) re-reflection 615 of the part of the original recording light that is reflected from the recording media. The setup comprises a laser 601 its raw laser beam 602, lensing 603, refracted laser beam 604, a mid-diffuser 605, an aperture 606, a patterned laser beam 607 and 614, a target substrate 608 and a rotating cylinder mounted on a x-axis translation stage 610 mounted upon an optical bench 611 supported by vibration-isolation elements 612. Mask 616 prevents undesired double exposure.

Figure 7:
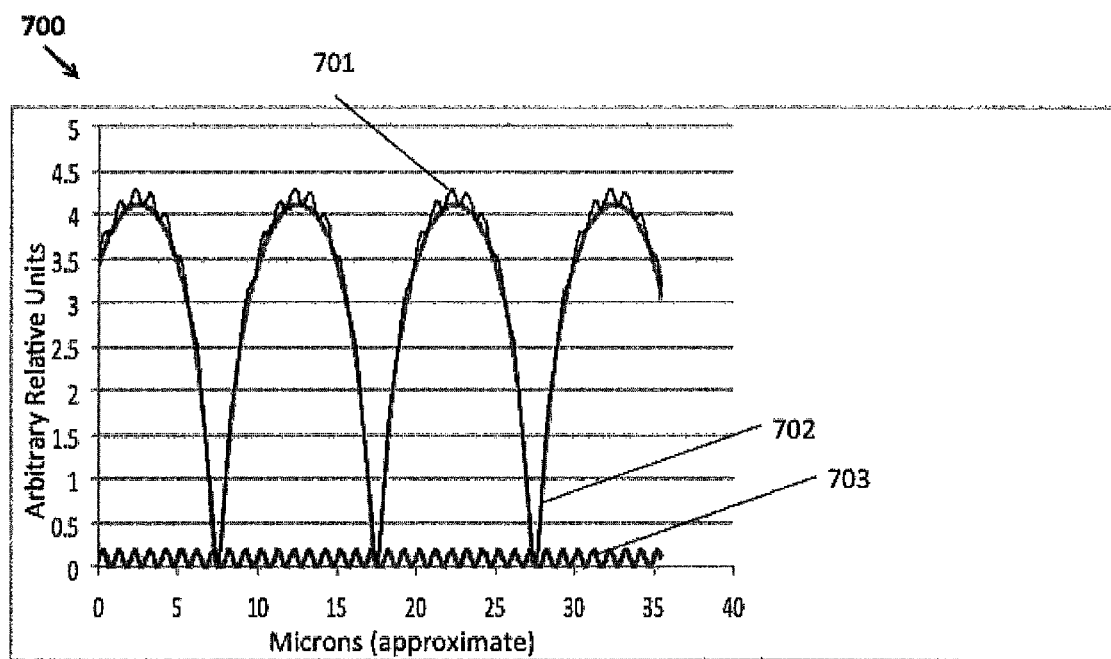
FIG. 7 is a chart (plot) of the superposition of the lower-frequencies produced by the base recording and the higher-frequencies produced by the overlay recording.

Referring to FIG. 7, a plot 700 of the composite structure 701 comprising the overlay of high spatial frequency signals 703 upon lower spatial frequency ones 702 is shown. In this example, the size of the higher optical frequency signal is about 1 micron, and the lower optical frequency signal is about 10 microns.

Figure 8:
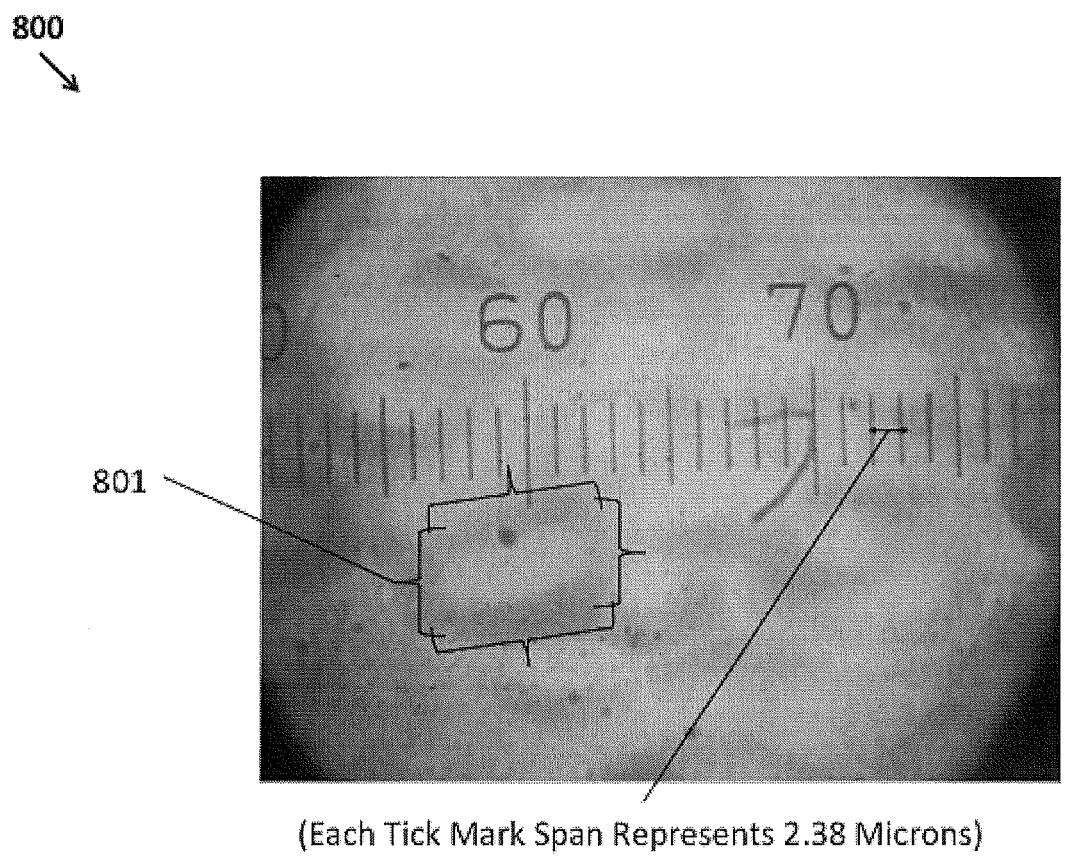
FIG. 8 is a photomicrograph of a holographic optical diffuser with only the lower-frequency surface relief microstructures.

Referring to FIG. 8, a photomicrograph of a legacy (prior art) diffuser 800 produced with only the lower frequency structures (approx. 20 microns×10 microns in this example) 801.

Figure 9:
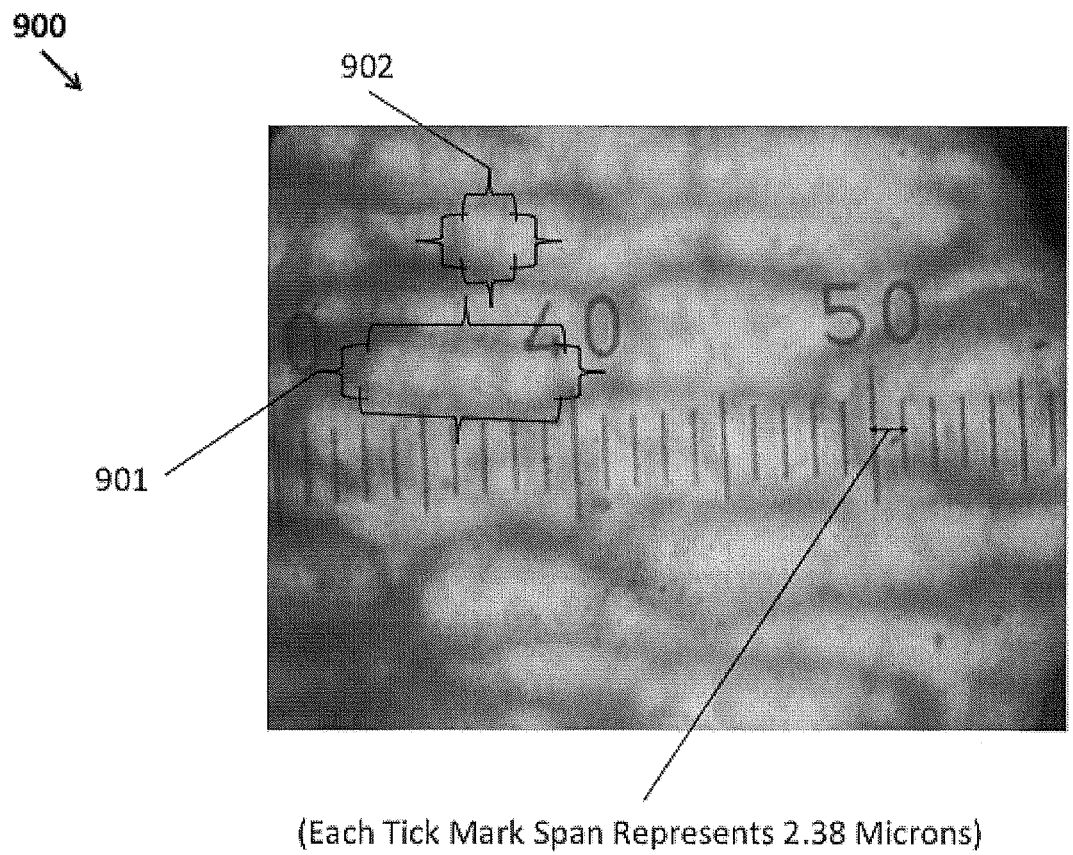
FIG. 9 is a photomicrograph of a preferred embodiment of the present invention with higher-frequency surface relief microstructures superimposed upon the lower-frequency surface relief structures shown in FIG. 7.

Referring to FIG. 9, a photomicrograph of the composite diffuser of the present invention, one can see the higher spatial frequency (approx. 5 micron×8 micron) structures 902 superimposed upon the lower ones 901.

Figure 10:
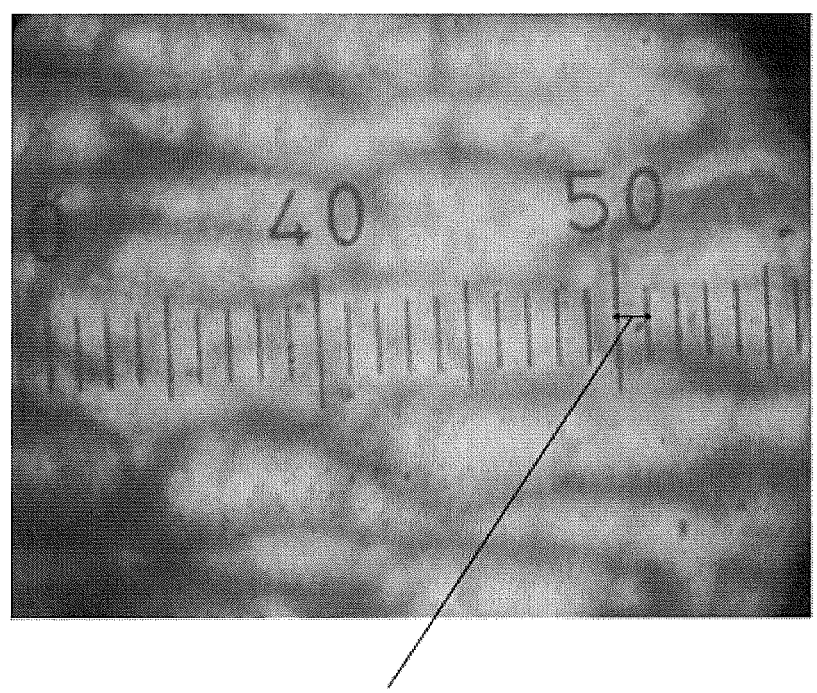
FIG. 10 is the photomicrograph of FIG. 9 without the individual surface relief structure callouts (for visual clarity).

Referring to FIG. 10, the photomicrograph of FIG. 9 is shown without the individual microstructures called out (for visual clarity).

Method of Production

Basic Exposure Process to Produce Primary LSD Structure

Equipment
1) Optical table
2) Laser
3) Substrate with photo-resist material
4) Optical shutter
5) Lenses—Spherical, Aspherical and Cylindrical
6) Aperture
7) Mid Diffuser
8) Motion Stage
9) Lens holders, posts, post holders, rails, etc.

Figure 1:
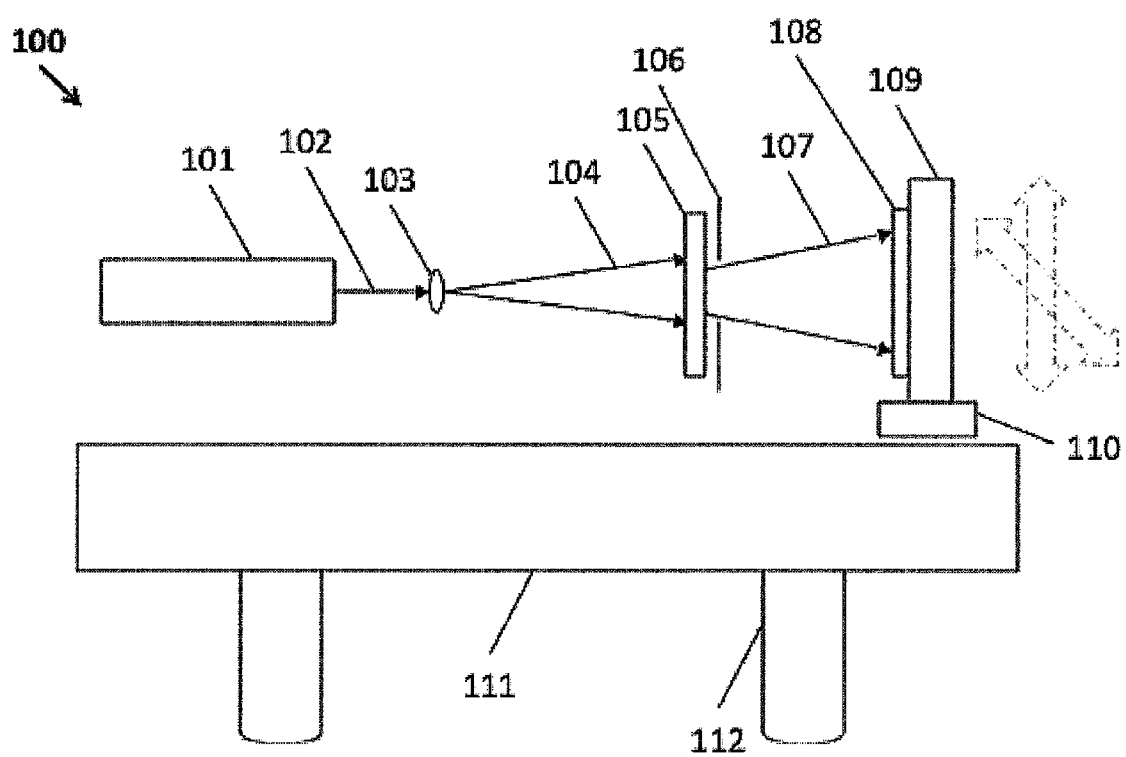
FIG. 1 is an illustration of prior art equipment setup used to create planar (i.e., flat) optical holographic diffuser masters.

Procedure:
1) Layout the optical elements onto the optical table as shown in FIG. 1. Exact layout will depend upon angle desired.
2) Measure the spot size at the Substrate.
3) Calculate the amount of movement to get uniform angle.
4) Calculate exposure (time and laser power) per shot to form the correct angle.
5) Program the stage and shutter according to the calculations.
6) Run the program and leave the room to reduce noise in the recording.
7) When the program is finished, remove the substrate and develop the photo-resist.

Method for Overlaying Secondary High Frequency Structure

Method 1

1) Expose plate as previously explained.
   a. Method 1 can be applied prior to development step.
   b. Method 1 can be applied after development step.
2) Set up high frequency optical layout. The mid diffuser is set much closer to the recording substrate (0.1" to 2"), the full width half maximum (fwhm) spot size on the mid diffuser ideally is the same or larger than the distance to the substrate. The diffraction features (minimum size) recorded will be approximately 1.3*wavelength*distance/(spot size on mid diffuser).
   a. If recording on a flat substrate, the mid-diffuser can be flat.
   b. If recording on a cylindrical substrate (as with seamless recording), the mid-diffuser can be cylindrical in order reduce the apparent distance to the substrate.
3) Develop normally.

Method 2

Figure 2:
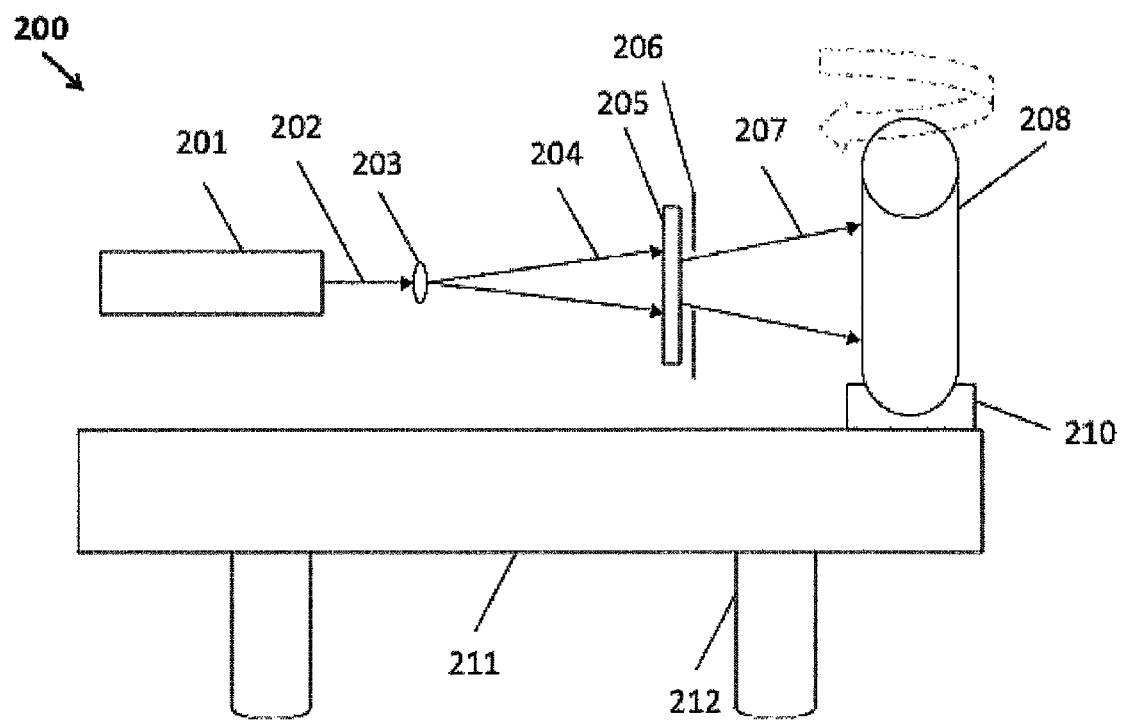
FIG. 2 is an illustration of prior art equipment setup used to create cylindrical (seamed and seamless) holographic optical diffuser masters.

1) Set up the optics the same as the basic setup.
2) Once the basic set up is done, place an additional optic:
   a. Partial mirror that can also be a flat window (0.1" to 5") in front of the recording substrate for flat substrate.
   b. Cylindrical window (0.1" to 5") concentric to the recording substrate FIG. 2.
3) Follow the exposure process.
4) Develop normally.

This method will produce features that are smaller than 1 micron. The substructure tends to be fractal in nature.

Method 2 can only be applied with a single exposure; i.e., optical tiling will not work since the high frequency tends to be blurred out in the process.

The invention claimed is:

1. A method of suppressing undesired visible optical artifacts on a substrate comprising the steps of:
   coating a substrate with a photoresist recording media;
   placing a holographic optical diffuser, an aperture, and a partial mirror, in that order, in front of the substrate in a first position spaced from the substrate;
   exposing the substrate in a first step with a laser beam through the holographic optical diffuser, the aperture, and the partial mirror in the first position to form a first microstructure of a certain size and the diffused laser beam reflected off the photoresist recording media is re-reflected back by the partial mirror onto the photoresist recording media to form a second microstructure overlaid on the first microstructure and different in size from said first microstructure;
   whereby said second microstructure suppresses the undesired visible optical artifacts.

2. The method of claim 1 wherein the partial mirror in the path of the laser beam is less than about 4 inches from the substrate.

3. The method of claim 1 wherein the holographic optical diffuser is less than about 4 inches from the substrate.

4. The method of claim 1 wherein the second microstructure is smaller than the first microstructure.

* * * * *